United States Patent
Snibbe

Patent Number: 5,886,710
Date of Patent: Mar. 23, 1999

[54] DEFINING A TIME-VARIABLE PROPERTY IN DIGITAL COMPOSITIONS

[75] Inventor: Scott S. Snibbe, Seattle, Wash.

[73] Assignee: Adobe Systems Incorporated, San Jose, Calif.

[21] Appl. No.: 693,945

[22] Filed: Aug. 7, 1996

[51] Int. Cl.$^6$ .................................................. G06F 12/00
[52] U.S. Cl. ......................................................... 345/473
[58] Field of Search .............................................. 345/473

[56] References Cited

U.S. PATENT DOCUMENTS

| | | | |
|---|---|---|---|
| 5,053,760 | 10/1991 | Frasier et al. | 345/473 |
| 5,459,830 | 10/1995 | Ohba et al. | 345/473 |
| 5,689,682 | 11/1997 | Peasley et al. | 395/500 |

OTHER PUBLICATIONS

S. Snibbe, "A Direct Manipulation Interface for 3D Computer Animation," *Eurographics,* 1995, vol. 14, No. 3. 7 pages.

S. Snibbe, "Gestural Controls for Computer Animation," Term paper, Brown University, Sep. 1994, 42 pages.

*Primary Examiner*—Rudolph J. Buchel, Jr.
*Assistant Examiner*—Motilewa Good-Johnson
*Attorney, Agent, or Firm*—Fish & Richardson P.C.

[57] ABSTRACT

Values for a property of a layer in a composition over a period of time are established by sampling user input at a sequence of sample times to obtain a sequence of input values, corresponding the sequence of sample times with a sequence of layer times, and determining a sequence of property values for the first layer from the sequence of input values, the sequence of property values corresponding to the sequence of layer times.

15 Claims, 2 Drawing Sheets

DEFINING A TIME-VARIABLE PROPERTY IN DIGITAL COMPOSITIONS

BACKGROUND

The invention relates to defining a time-variable property in digital compositions.

A digital composition typically has a sequence of frames, each containing data describing, for example, the audio or visual content of the frame. When the composition is played, the frames are sequentially output, and temporal changes in the composition are conveyed by the changing data in sequentially output frames.

A composition includes at least one layer. A layer also contains a sequence of frames containing data, such as audio or visual data, and generally may be individually created and edited. If the composition has more than one layer, the data from temporally corresponding frames of each layer are combined to form data for corresponding composition frames.

A time-variable property, such as the position of a layer, is generally defined by numeric values in a layer, and changes in that property over time are represented by changes in the property value in sequential layer frames. Traditionally, values for a time-variable property are defined for selected frames of the layer, referred to as key frames. To enable smooth changes of the property value, curve fitting based on the property values defined for the key frames determines a continuous curve defining property values for the intermediate frames between the key frames.

Properly defining property values over time requires a user to input values for individual key frames, and may require the user to create additional key frames to ensure that the fitted curve does not improperly define the property values in intermediate frames. Property definition can thus be a time consuming process.

SUMMARY

The present invention establishes values and timing for a time-variable property in a layer of a digital composition based on user input.

In general, in one aspect, the invention features a method that samples a user input at a sequence of sample times to obtain a sequence of input values, corresponds the sequence of sample times with a sequence of layer times, and determines a sequence of property values for a first layer from the sequence of input values, the sequence of property values corresponding to the sequence of layer times.

Embodiments of the invention may include one or more of the following features. The sample times of the sequence of sample times occur at regularly spaced intervals.

The correspondence between the sequence of sample times with the sequence of layer times is determined by user input.

The method displays, as the user input is sampled, the property values in the sequence of property values determined for the first layer.

The method plays a second layer of the composition as the input signal is sampled, at a rate determined by the correspondence between the sequence of sample times and the sequence of layer times.

The method determines a curve based on the determined sequence of property values, the curve defining property values corresponding to intermediate layer times between the sequence of layer times for which the sequence of property values defines property values.

In general, in another aspect, the invention enables use of the computer-implemented method through a memory device storing computer-readable instructions to establish values for a property of a layer in a composition over a period of time.

Among the advantages of the invention are one or more of the following. Enabling a user to define time-variable property values with real time input avoids the time consuming process of creating key frames and defining property values for the key frames, and allows the user to define property values without understanding the complexities of key frames and curve fitting, nor the method by which the property is implemented.

Defining time-variable properties with real-time user input allows users to modify property values by entering new input, avoiding the need to create new key frames or redefine existing key frames.

Enabling the timing of the user input to be scaled in creating the layer data provides user flexibility in determining the rate at which a time-variable property changes in the layer. Providing simultaneous preview of other layers at the scaled rate facilitates synchronization of the property values defined by user input to the other layers.

Other features and advantages of the invention will become apparent from the following description and from the claims.

DETAILED DESCRIPTION

The present invention establishes data in a composition layer reflecting values and timing of a time-variable property defined by user input.

Figure 1:
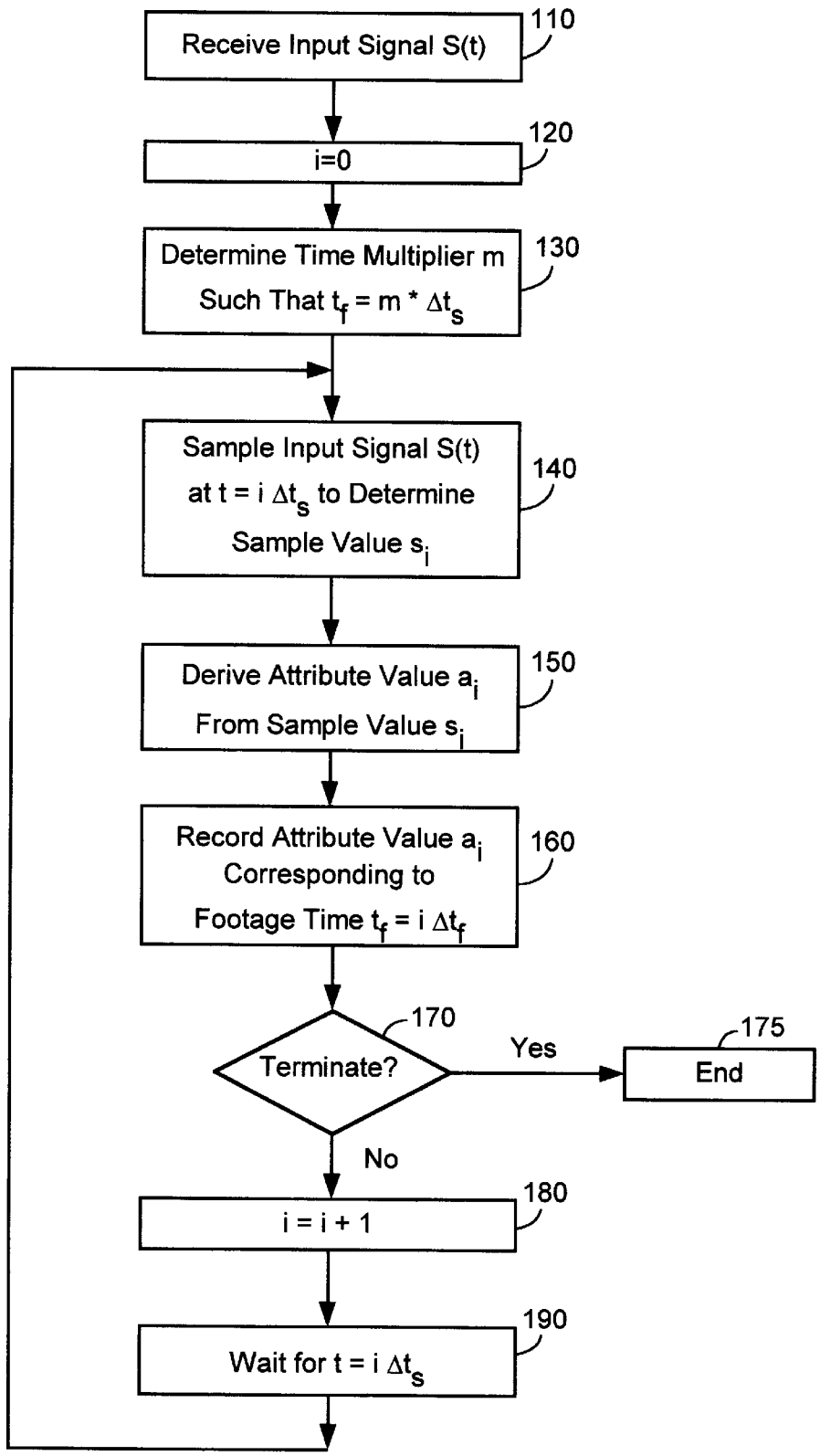
FIG. 1 illustrates a flow diagram for a method for defining a time-variable property of a digital composition.

Referring to FIG. 1, a processing system receives user input defining values for a time-variable property of a layer. User input may be of various forms. For example, user input may be a mouse position defining a position of a layer.

The system samples the user input at a sample time $t_i$ (110), derives a property value $p_i$ from the sampled input value corresponding to sample time $t_i$ (120), and records property value $p_i$ and a layer time corresponding to sample time $t_i$ as layer data (130). In one embodiment, sample times occur at regularly spaced intervals so that the actual times need not be recorded, because they can readily be calculated. In another embodiment, the sampling times are recorded, so the sample times may occur at irregularly spaced intervals.

The system records the data by creating a key frame in the layer at the layer time corresponding to sample time $t_i$ and recording $p_i$ as the property value in the newly created key frame.

The system may scale the timing of the user input by a time multiplier m to determine corresponding timing of the property values in the layer. For example, for user input sampled at a time $t_i$, the sampled property value $p_i$ is recorded in a key frame for the layer, created at a layer time $m*t_i$. The system may receive time multiplier m as user input, or it may calculate m based on a requirement that the layer fit into a particular time window.

In a interface, the system provides a preview of the property value being defined by displaying the changing value of the property as the user input changes. For example, if user input defines the position of a layer, as the user draws the path, the layer position is displayed on a monitor, varying in accordance with values and timing of the path defined by the user input.

The system also provides an audio preview. If a composition includes multiple layers, including a first layer having the time-variable property defined by the user input, and a second layer providing audio data, the system runs the second layer, outputting the audio data, simultaneously with the user input. The system scales the audio data to be output at the layer rate. This allows the user to synchronize the user input defining values for the layer property to the audio data of the second layer.

Audio preview is one example of the system's ability to run a layer, or multiple layers, of the composition, at a scaled rate if necessary, simultaneously with the user input defining a property of the same or a different layer. As another example, the system can run a second layer providing visual data at an appropriately scaled rate, allowing the user to synchronize the property defined by user input to the displayed visual data.

The system samples the user input until a termination condition is detected (140). A variety of criteria may be used to signal termination. Termination may occur when user input ceases, or when a pre-specified duration of user input has expired.

If no termination condition is met, the system waits for the next sample time (145) and repeats the sampling process (110).

If termination conditions are met, conventional methods such as curve fitting may be used to determine property values in the time intervals between the layer times having specifically defined property values (150).

Depending on factors such as the sampling frequency and the smoothness of the user input, the system may create more key frames than are necessary or are desired by a user. The system therefore provides a smoothing function the user can invoke to identify and remove those key frames that can be removed with minimal or no effect on the overall curve for the property value (160).

While the invention has been described in terms of a software implementation, the invention may be implemented in hardware or software, or a combination of both. Preferably, the invention is implemented in a software program executing on a programmable processing system comprising a processor, a data storage system, an input device, and an output device.

Figure 2:
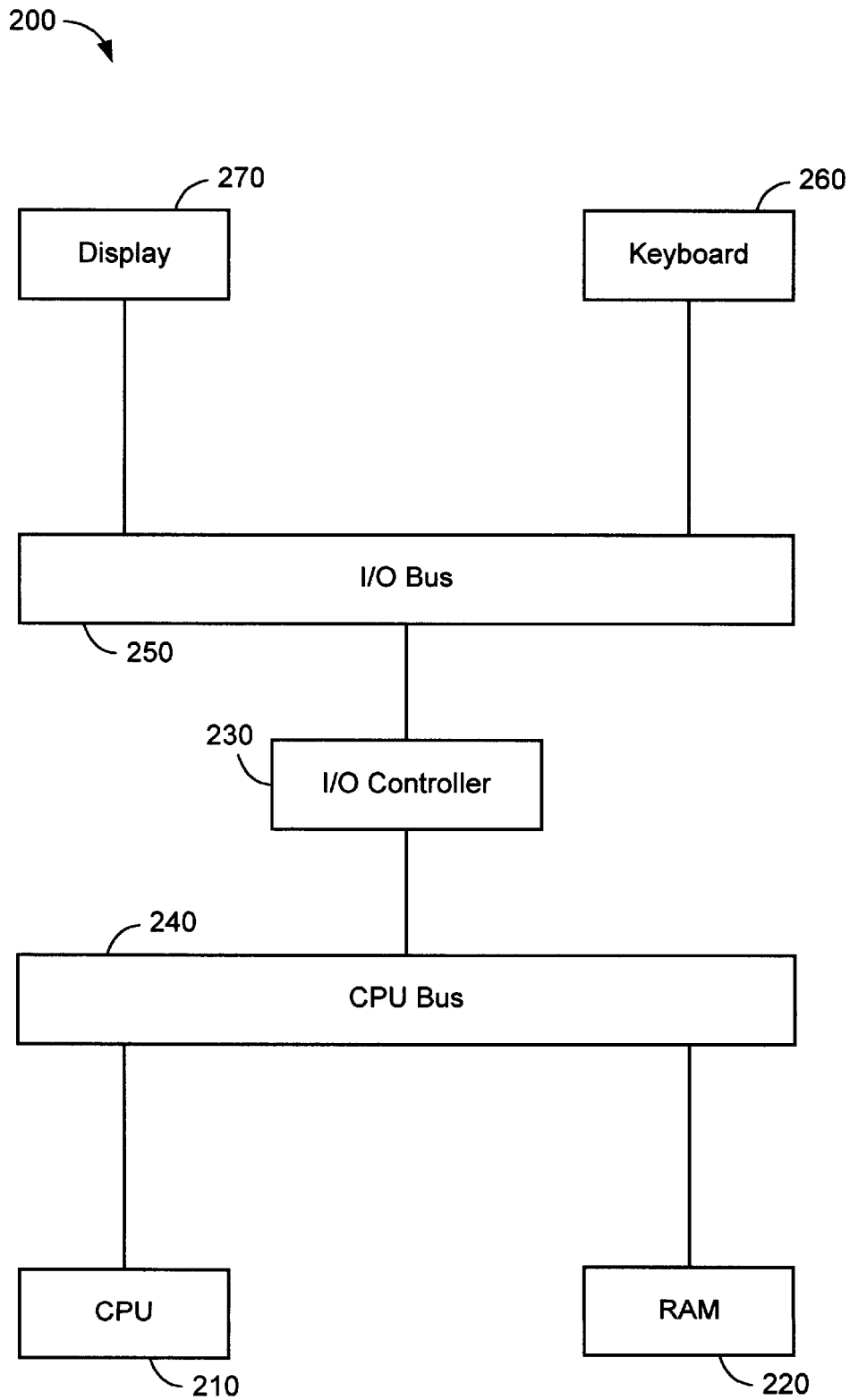
FIG. 2 illustrates a programmable processing system suitable for use with the present invention.

FIG. 2 illustrates one such programmable processing system 200, including a CPU 210, a RAM 220, and an I/O controller 230 coupled by a CPU bus 240. The I/O controller 230 is also coupled by an I/O bus 250 to input devices such as a keyboard 260, and output devices such as a display 270.

Other embodiments are within the scope of the following claims. For example, a variety of time-variable properties may be controlled by user input, including visual properties such as size, color, and shape, and audio properties such as volume. User input may be generated using a variety of input devices, including a mouse, a joystick, a digitized coordinate pen, and keyboard keys.

What is claimed is:

1. A computer-implemented method for defining a time-variable property for a layer in a composition comprising:

sampling a user input for a first time-variable property at a sequence of sample times to obtain a sequence of values for the first time-variable property;

defining a scaling function for corresponding the sequence of sample times with a sequence of layer times associated with the layer, where the layer times determine the timing for outputting the values associated with a time-variable property when the composition is played; and while sampling the user input, displaying a second time-variable property of the composition at a scaled rate defined by the scaling function whereby a user can synchronize the first and second time-variable properties.

2. The method of claim 1, wherein the sample times of the sequence of sample times occur at regularly spaced intervals.

3. The method of claim 1, wherein defining a scaling function for corresponding the sequence of sample times with the sequence of layer times is determined by user input.

4. The method of claim 1, wherein the composition has a plurality of layers, and wherein the plurality of layers are played simultaneously at the scaled rate as the user input is sampled.

5. The method of claim 1, further comprising determining a curve based on the values of the first time-variable property, the curve interpolating values for the first time-variable property corresponding to intermediate layer times for which a property value is not defined.

6. The method of claim 1, wherein the time-variable properties are selected from the group of size, color, shape, location, rotation, and audio selection and volume.

7. The method of claim 1, further comprising:

scaling the sequence of sample times with the scaling function to obtain a sequence of layer times associated with the layer; and recording the sequence of values for the first time-variable property in the layer at the corresponding sequence of layer times.

8. The method of claim 7 further comprising creating a sequence of keyframes in the layer at the sequence of layer times, and wherein the sequence of values for the time-variable property is recorded in the sequence of keyframes.

9. The method of claim 1 wherein the second time variable property is an audio selection and the audio selection is played simultaneously with the sampling of the first time-variable property.

10. A memory device storing computer-readable instructions for aiding a computer to define a time-variable property for a layer in a composition, the memory device comprising:

instructions for sampling a user input for a first time-variable property at a sequence of sample times to obtain a sequence of values for the first time-variable property;

instructions for defining a scaling function for corresponding the sequence of sample times with a sequence of layer times associated with the layer, where the layer times determine the timing for outputting the values associated with a time-variable property when the composition is played; and instructions for displaying a second time-variable property of the composition at a scaled rate defined by the scaling function while sampling the user input whereby a user can synchronize the first and the second time-variable properties.

11. The memory device of claim 10, wherein the sample times in the sequence of sample times occur at regularly spaced intervals.

12. The memory device of claim 10, wherein defining a scaling function for corresponding the sequence of sample times with the sequence of layer times is determined by user input.

13. The memory device of claim 10, wherein the composition has a plurality of layers, and wherein the plurality of layers are played simultaneously at the scaled layer rate as the user input is sampled.

14. The memory device of claim 10, further comprising instructions for determining a curve based on the values of the first time-variable property, the curve interpolating values for the first time-variable property corresponding to intermediate layer times for which a property value is not defined.

15. A computer-implemented method for defining a time-variable property for a layer in a composition comprising:

defining a scaling factor for corresponding a sequence of sample times with a sequence of layer times associated with the layer, where the layer times determine the timing for outputting the values associated with a time-variable property when the composition is played;

displaying a second time-variable property at a scaled rate defined by the scaling factor;

while displaying the second time-variable property at the scaled rate, sampling a user input for a first time-variable property at a sequence of sample times to obtain a sequence of values for the first time-variable property;

scaling the sequence of sample times with the scaling factor to obtain a sequence of layer times associated with the layer; and recording the sequence of values for the first time-variable property in the layer at the corresponding sequence of layer times.

* * * * *